US012620382B2

(12) United States Patent
Kanai et al.

(10) Patent No.: US 12,620,382 B2
(45) Date of Patent: May 5, 2026

(54) PIEZOELECTRIC SOUND COMPONENT HAVING A CASE WITH STEPPED PORTION

(71) Applicant: Murata Manufacturing Co., Ltd., Nagaokakyo (JP)

(72) Inventors: Shungo Kanai, Nagaokakyo (JP); Tadashi Okuzawa, Nagaokakyo (JP); Toshiyuki Sakai, Nagaokakyo (JP); Yuta Okada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 768 days.

(21) Appl. No.: 18/067,101

(22) Filed: Dec. 16, 2022

(65) Prior Publication Data

US 2023/0121216 A1 Apr. 20, 2023

Related U.S. Application Data

(63) Continuation of application No. PCT/JP2021/041201, filed on Nov. 9, 2021.

(30) Foreign Application Priority Data

Mar. 12, 2021 (JP) ................................ 2021-040209

(51) Int. Cl.
*G10K 9/122* (2006.01)
*B06B 1/06* (2006.01)
(Continued)

(52) U.S. Cl.
CPC ................ *G10K 9/122* (2013.01); *B06B 1/06* (2013.01); *G10K 13/00* (2013.01); *H04R 17/00* (2013.01)

(58) Field of Classification Search
CPC .......... G10K 9/122; G10K 9/22; G10K 13/00; B06B 1/06; B06B 1/0603; B06B 2201/55;
(Continued)

(56) References Cited

U.S. PATENT DOCUMENTS 10,887,701 B2 * 1/2021 Palmer .................. H04R 9/025
2016/0155926 A1 6/2016 Ishii et al.
(Continued)

FOREIGN PATENT DOCUMENTS

JP S59137700 U 9/1984
JP H10224894 A 8/1998
(Continued)

OTHER PUBLICATIONS

International Search Report in PCT/JP2021/041201, mailed on Feb. 1, 2022, 3 pages.

*Primary Examiner* — Emily P Pham
(74) *Attorney, Agent, or Firm* — ArentFox Schiff LLP

(57) ABSTRACT

A piezoelectric sound component is provided that includes a piezoelectric diaphragm and a case. The piezoelectric diaphragm is accommodated in the case. Moreover, a diaphragm 10 has a peripheral portion that includes a first peripheral portion and a second peripheral portion. The first peripheral portion is fixed to the case and the second peripheral portion is movable relative to the case. The case includes a step that is in positional agreement with the second peripheral portion in the thickness direction of the diaphragm. The step and the second peripheral portion define a clearance therebetween.

20 Claims, 13 Drawing Sheets

(51) Int. Cl.
*G10K 13/00* (2006.01)
*H04R 17/00* (2006.01)

(58) Field of Classification Search
CPC . H04R 17/00; H04R 7/22; H04R 1/28; H04R 31/006
See application file for complete search history.

(56) References Cited

U.S. PATENT DOCUMENTS

| | | | |
|---|---|---|---|
| 2017/0132998 | A1 | 5/2017 | Yamauchi |
| 2018/0270583 | A1 | 9/2018 | Yokoi et al. |
| 2021/0337315 | A1 | 10/2021 | Pankiang et al. |
| 2022/0141594 | A1 | 5/2022 | Yokoi et al. |

FOREIGN PATENT DOCUMENTS

| | | | |
|---|---|---|---|
| JP | H11-355892 | A | 12/1999 |
| JP | 2016111662 | A | 6/2016 |
| WO | 2016067707 | A1 | 5/2016 |
| WO | 2018061319 | A1 | 4/2018 |
| WO | 2020217637 | A1 | 10/2020 |
| WO | 2021033376 | A1 | 2/2021 |

* cited by examiner

PIEZOELECTRIC SOUND COMPONENT HAVING A CASE WITH STEPPED PORTION

CROSS REFERENCE TO RELATED APPLICATIONS

This application is a continuation of PCT Application No. PCT/JP2021/041201, filed Nov. 9, 2021, which claims priority to Japanese Patent Application No. 2021-040209, filed Mar. 12, 2021, the entire contents of each of which are hereby incorporated by reference in their entirety.

TECHNICAL FIELD

The present invention relates to a piezoelectric sound component.

BACKGROUND

Currently, sound components that generate warning sound and operation sound are used as buzzers and piezoelectric receivers in a wide range of applications, such as electronic devices, household appliances, and mobile phones. This leads a demand for piezoelectric sound components with excellent acoustic conversion efficiency.

An example of a piezoelectric sound component is disclosed in WO2021/033376 (hereinafter "Patent Document 1"), which includes a diaphragm that has slits. Although an upper air chamber and a lower air chamber on the respective sides of the diaphragm are not sealed, air convection between the air chambers is suppressed such that the piezoelectric sound component produces large displacement and high acoustic pressure.

In general, such piezoelectric sound components should include a thin diaphragm to exhibit excellent characteristics in relation to acoustic pressure or, more specifically, to produce large displacement and high acoustic pressure and to generate a low-frequency sound that is clearly audible. Moreover, the slits in the diaphragm of the piezoelectric sound component disclosed in Patent Document 1 are through-slits formed in the thickness direction of the diaphragm. Extra-fine slits are to be formed in a thin diaphragm such that the effect of suppressing air convection will not wear off. Unfortunately, it is difficult to form extra-fine slits, and component-to-component variations are likely to be produced. Furthermore, vibration of the diaphragm can cause deformation of slits, which would in turn become wider. In such a case, the piezoelectric sound component can fail to exhibit its acoustic pressure characteristics in a stable manner.

SUMMARY OF THE INVENTION

Accordingly, the exemplary aspects of the present invention provides a piezoelectric sound component that is designed with structural simplicity to exhibit excellent characteristics in relation to acoustic pressure without impairment of acoustic conversion efficiency.

In an exemplary aspect, a piezoelectric sound component is provided that includes a piezoelectric diaphragm and a case. The piezoelectric diaphragm includes a diaphragm and a piezoelectric member. Moreover, the diaphragm has a middle portion and a peripheral portion surrounding the middle portion. The piezoelectric member is disposed on the middle portion. The case has an internal space with the piezoelectric diaphragm being disposed in the internal space. The peripheral portion of the diaphragm includes a first peripheral portion fixed to the case and a second peripheral portion movable relative to the case. The case includes a step that is in positional agreement with the second peripheral portion in a thickness direction of the diaphragm. Moreover, a clearance (or space) is defined between the step and the second peripheral portion.

With such structural simplicity of the exemplary aspects, the piezoelectric sound component according to the present invention exhibits excellent characteristics in relation to acoustic pressure without impairing acoustic conversion efficiency.

DETAILED DESCRIPTION OF EMBODIMENTS

Hereinafter, exemplary embodiments of the present invention will be described. In the accompanying drawings, the same or like reference signs denote the same or like elements. The accompanying drawings are provided merely as examples. The individual elements are schematically illustrated in terms of their dimensions and shapes. The following exemplary embodiments should not be construed as limiting the technical scope of the present invention.

First Exemplary Embodiment

Piezoelectric Sound Component 1

Figure 1:
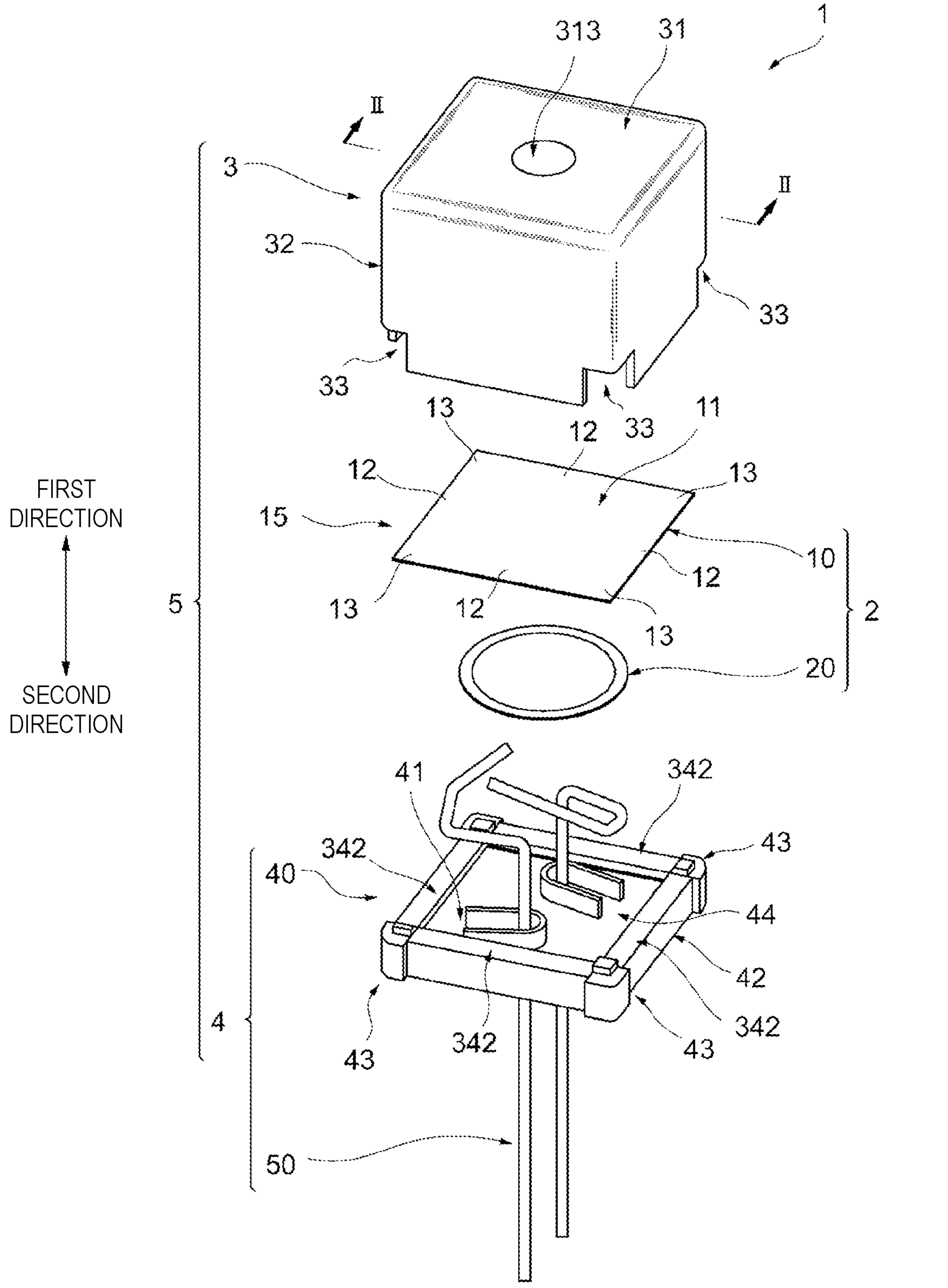
FIG. 1 is an exploded perspective view of a piezoelectric sound component according to a first exemplary embodiment.
Figure 2:
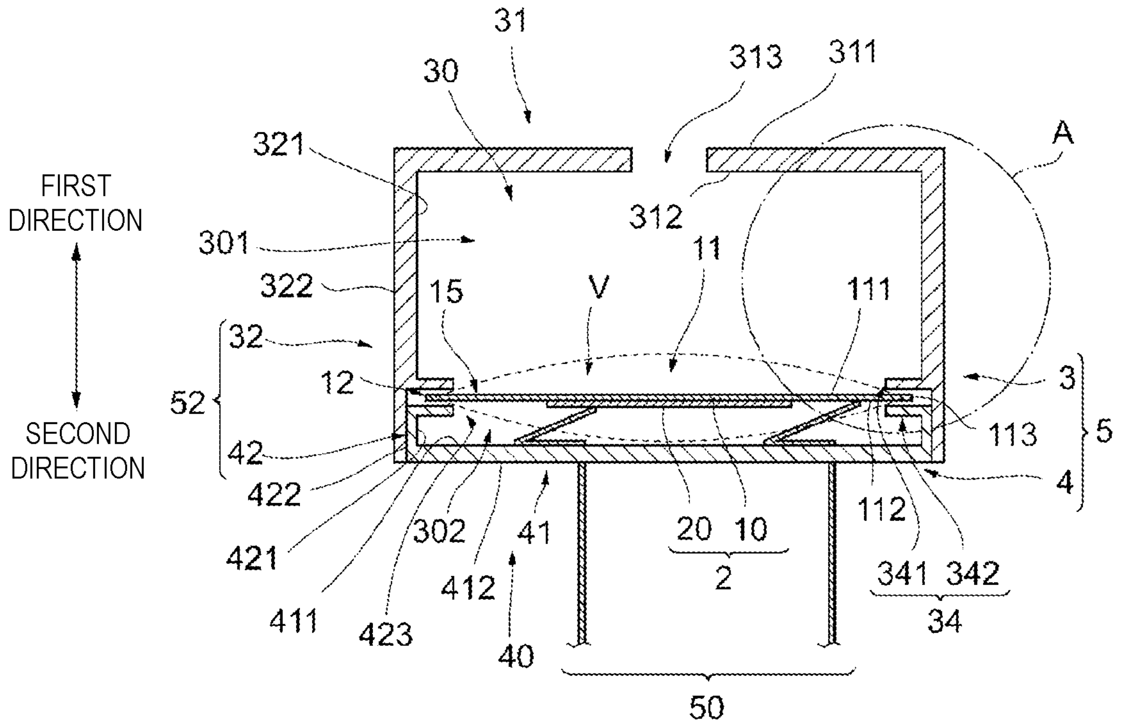
FIG. 2 is a sectional view taken along line II-II in FIG. 1.

The following describes the overview of a piezoelectric sound component 1 according to a first exemplary embodiment with reference to FIGS. 1 and 2. FIG. 1 is an exploded perspective view of the piezoelectric sound component 1 according to the first embodiment. FIG. 2 is a sectional view taken along line II-II in FIG. 1. The state illustrated in FIG. 2 may be hereinafter referred to as an assembled state of the piezoelectric sound component 1.

The piezoelectric sound component 1 is an example of a pin-type sound component according to an exemplary aspect. Referring to FIG. 1, the piezoelectric sound component 1 includes a piezoelectric diaphragm 2 and a case 5. The piezoelectric diaphragm 2 is accommodated in the case 5. Moreover, the case 5 includes a case main body 3 and a lid 4. The case main body 3 has an opening that is then closed with the lid 4. Referring to FIG. 2, the case 5 has an internal space 30 and includes a step 34. The internal space 30 is enclosed with the case main body 3 and the lid 4. The step 34 is located in the internal space 30 and is provided to a surrounding wall of the case 5. The step 34 includes a first step 341 and a second step 342. The first step 341 is provided to the case main body 3 and the second step 342 is provided to the lid 4 in the exemplary aspect.

In the assembled state, the piezoelectric diaphragm 2 is disposed in the internal space 30. As further shown, one part of the piezoelectric diaphragm 2 is sandwiched between the case main body 3 and the lid 4 and is fixed to the case 5. The other part of the piezoelectric diaphragm 2 is fitted in (or otherwise disposed within) the step 34 in a manner so as to be movable relative to the case 5. The other part of the piezoelectric diaphragm 2 is fitted in the step 34 with a clearance P therebetween in the exemplary aspect. In addition, the lid 4 is provided with two pin terminals 50, which are electrically connected to the piezoelectric diaphragm 2. In operation and upon application of an alternating voltage to the piezoelectric diaphragm 2 through the two pin terminals 50, the piezoelectric diaphragm 2 reciprocates in the internal space 30 in a manner denoted by a broken line in FIG. 2. The reciprocating motion produces a (e.g., beeping) sound, for example, in an exemplary aspect.

Details of Piezoelectric Sound Component 1

Figure 3:
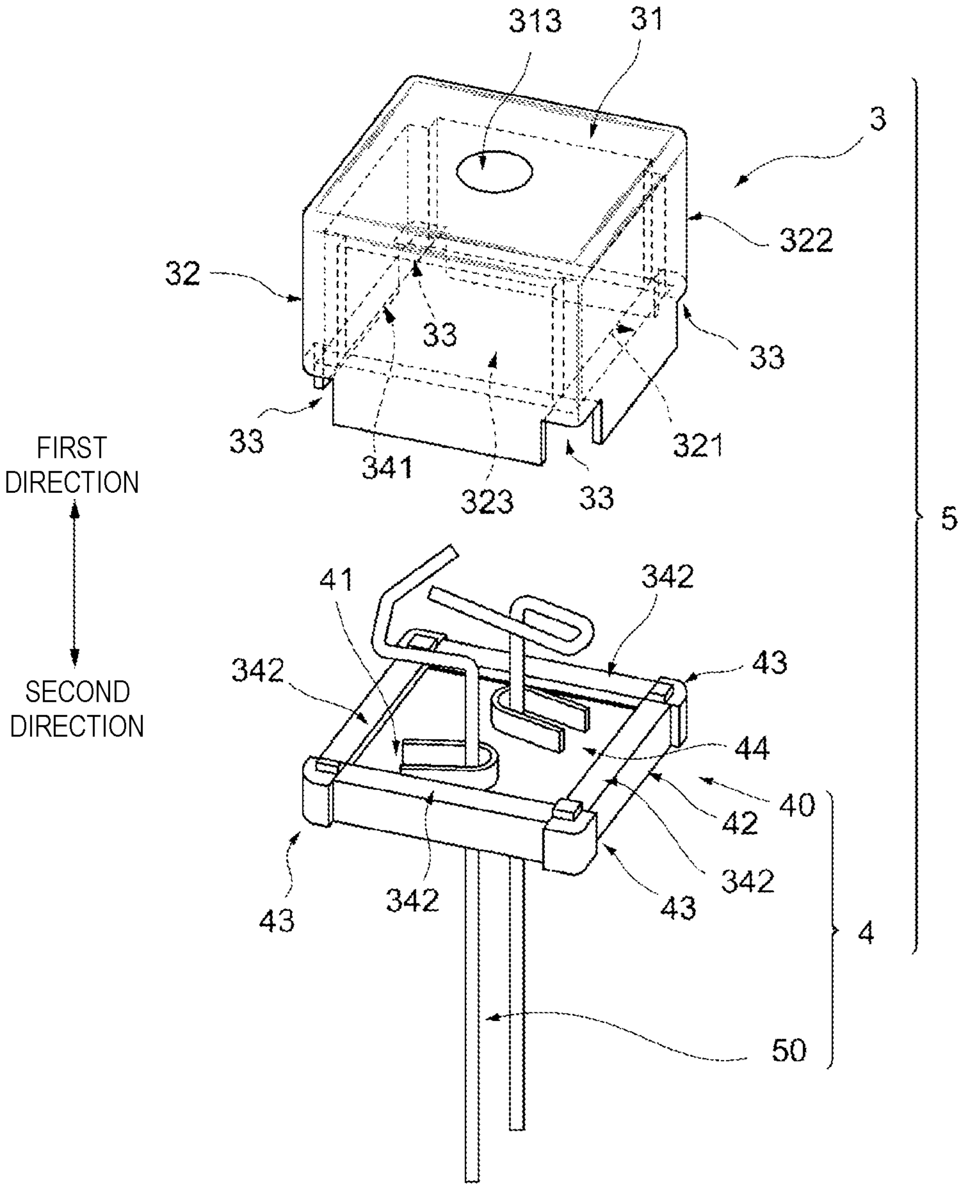
FIG. 3 illustrates a case in the first embodiment.
Figure 4:
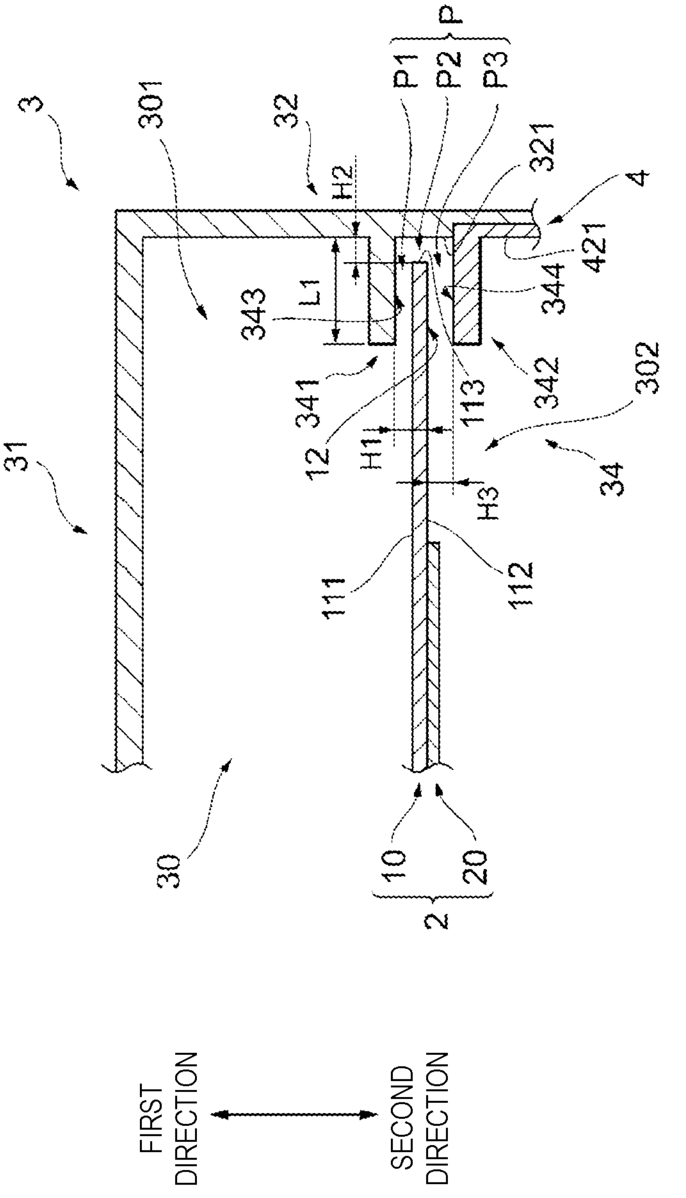
FIG. 4 is an enlarged view of Part A in FIG. 2.

Elements of the piezoelectric sound component 1 will be described in detail below with reference to FIGS. 1 to 4. FIG. 3 illustrates the case 5 in the first embodiment. FIG. 4 is an enlarged view of Part A in FIG. 2.

Piezoelectric Diaphragm 2

As shown, the piezoelectric diaphragm 2 is in the form of a thin plate. Referring to FIGS. 1 and 2, the piezoelectric diaphragm 2 includes a diaphragm 10 and a piezoelectric member 20, which is provided to the diaphragm 10.

The diaphragm 10 is in the form of a sheet. Main surfaces of the diaphragm 10 are square when viewed in plan. In alternative embodiments, the main surfaces of the diaphragm 10 can be circular or rectangular when viewed in plan. For example, the diaphragm 10 has a thickness of about 0.05 mm. No cutouts or, more specifically, no through-slits are formed in the thickness direction of the diaphragm 10 in the example illustrated in FIG. 1.

In an exemplary aspect, the diaphragm 10 is made of a material that conducts electricity well and exhibits spring elastic properties. For example, the diaphragm 10 is made of metal having an elastic modulus of 1 GPa or higher. The diaphragm 10 is preferably made of 42 Alloy, stainless steel (SUS), brass, or phosphor bronze. In some embodiments, the diaphragm 10 is made of a resin material and a composite material. For example, the diaphragm 10 includes a glass epoxy resin substrate having an elastic modulus of 1 GPa or higher.

Referring to FIG. 2, the diaphragm 10 has a first main surface 111, a second main surface 112, and a side surface 113. In the assembled state, the first main surface 111 is oriented in (i.e., faces) a first direction, and the second main surface 112 is oriented in (i.e., faces) a second direction. As also shown, the second main surface 112 is electrically connected to one of the two pin terminals 50 provided to the lid 4.

The diaphragm 10 has a middle portion 11 and a peripheral portion 15. The middle portion 11 is in the middle of the diaphragm 10 in the direction in which the main surfaces of the diaphragm 10 extend. The middle portion 11 is surrounded by the peripheral portion 15. In the assembled state, the piezoelectric member 20 is located on the middle portion 11. As illustrated in FIG. 2, the middle portion 11 and part of the peripheral portion 15 (e.g., a second peripheral portion 12, which will be described later) form a vibration part V, where the piezoelectric diaphragm 2 reciprocates.

Referring to FIG. 1, the peripheral portion 15 includes a first peripheral portion 13 and the second peripheral portion 12. The first peripheral portion 13 includes four corners of the diaphragm 10. The second peripheral portion 12 is a region other than the four corners on the periphery of the diaphragm 10, for example, between each of the four corners on the side of the diaphragm 10. In other words, the second peripheral portion 12 corresponds to four sides (except for the corners) of the diaphragm 10.

For example, the first peripheral portion 13 is provided such that the piezoelectric diaphragm 2 is fitted to the case 5. In the assembled state, the first peripheral portion 13 is sandwiched between the case main body 3 and the lid 4 and is fixed to the case 5. The piezoelectric diaphragm 2 is fitted to the case 5 accordingly. The second peripheral portion 12 is movable relative to the case 5.

For example, the second peripheral portion 12 and the step 34 of the case main body 3 is provided such that air hardly circulates by convection between spaces on opposite sides in the thickness direction of the piezoelectric diaphragm 2. The step 34 will be described later. In the assembled state, the second peripheral portion 12 is fitted in the step 34 in a manner so as not to be in contact with the step 34. The positional relationship between the second peripheral portion 12 and the step 34 will be described later in detail in the section "Details of Step 34" provided below.

In the exemplary aspect, the piezoelectric member 20 is in the form of a sheet. The piezoelectric member 20 includes a pair of electrodes and a piezoelectric plate sandwiched between the electrodes. Main surfaces of the piezoelectric member 20 are circular when viewed in plan. With an adhesive applied to the middle portion 11 of the diaphragm 10, the piezoelectric member 20 is bonded to the second main surface 112.

In the assembled state, one of the electrodes of the piezoelectric member 20 is oriented in (i.e., faces) the first direction and is electrically connected to one of the two pin terminals 50 provided to the lid 4, where the second main surface 112 of the diaphragm 10 is located between the electrode and the pin terminal 50. The other electrode of the piezoelectric member 20 is oriented in (i.e., faces) the second direction and is electrically connected to the other pin terminal 50 provided to the lid 4.

Case Main Body 3

The case main body 3 is in the form of a box. The case main body 3 is made of an insulating material, such as a ceramic material or resin in the exemplary aspect. Referring to FIGS. 1 to 3, the case main body 3 includes a first top wall 31, a first surrounding wall 32, a first pressing portion 33, and the first step 341. The first surrounding wall 32 is on an end portion of the first top wall 31. Moreover, the first pressing portion 33 is composed of protrusions in the four corners of the first surrounding wall 32. The first step 341 is provided to the first surrounding wall 32.

The first top wall 31 is in the form of a thin plate. Main surfaces of the first top wall 31 are square when viewed in plan. As illustrated in FIG. 2, the main surfaces of the first top wall 31 are located on opposite sides in the thickness direction and are herein referred to as a top wall main surface 311 and a top wall main surface 312, respectively. The first top wall 31 has a sound emission hole 313, which is in the center of the first top wall 31. The sound emission hole 313 is a through-hole extending in the thickness direction of the first top wall 31 and is an interface between the inside and the outside of the case main body 3. In the assembled state, sound generated by the reciprocating motion of the piezoelectric diaphragm 2 is emitted through the sound emission hole 313 to the outside of the case 5.

The first surrounding wall 32 is in the form of a frame. Referring to FIGS. 2 and 3, the first surrounding wall 32 has an inner peripheral surface 321, an outer peripheral surface 322, and an opening 323, which is on an end of the first surrounding wall 32. The inner peripheral surface 321 is composed of four flat faces. In the assembled state illustrated in FIG. 2, an acoustic space 301 is defined by the top wall main surface 312, the piezoelectric diaphragm 2, and a region being part of the inner peripheral surface 321 and closer than the piezoelectric diaphragm 2 to the first-direction side; that is, the acoustic space 301 is located on the first-direction side in the internal space 30.

The first pressing portion 33 is a protruding structure that includes protrusions in the four corners of the first surrounding wall 32. The first pressing portion 33 extends in the height direction of the first surrounding wall 32. In the assembled state, the first peripheral portion 13 of the piezoelectric diaphragm 2 is sandwiched between the first pressing portion 33 and a second pressing portion 43 of the lid 4 such that the piezoelectric diaphragm 2 is fitted to the case 5. The second pressing portion 43 will be described later.

The first step 341 is provided to the first surrounding wall 32 and is located close to the opening 323. The first step 341 is composed of four projections, each of which is on the corresponding one of the four faces forming the inner peripheral surface 321, with the four projections extending in a widthwise direction inward and perpendicular to the thickness direction in the exemplary aspect. In the assembled state, the first step 341 is in positional agreement with the second peripheral portion 12 of the piezoelectric diaphragm 2. More specifically, the first step 341 extends along the second peripheral portion 12 in a manner so as to face the first main surface 111. In this state, the first step 341 is not in contact with the second peripheral portion 12. That is, a clearance (e.g., a space) is left between the first step 341 and the second peripheral portion 12, as illustrated in FIG. 4. The first step 341 will be described in detail later.

Lid 4

Referring to FIGS. 1 and 3, the lid 4 includes a lid main body 40 and the two pin terminals 50, which are provided to the lid main body 40.

The lid main body 40 is in the form of a box. In the exemplary aspect, the lid main body 40 is made of an insulating material, such as a ceramic material or resin. Referring to FIGS. 1 to 3, the lid 4 includes a second top wall 41, a second surrounding wall 42, the second pressing portion 43, a fixation portion 44, and the second step 342. The second surrounding wall 42 is on an end portion of the second top wall 41. The second pressing portion 43 is composed of protrusions on the four corners of the second top wall 41. The fixation portion 44 is provided to the second top wall 41. The second step 342 is provided to the second surrounding wall 42.

As further shown, the second top wall 41 is in the form of a thin plate. Main surfaces of the second top wall 41 are square when viewed in plan. As also illustrated in FIG. 2, the main surfaces of the second top wall 41 are located on opposite sides in the thickness direction and are herein referred to as a top wall main surface 411 and a top wall main surface 412, respectively. The second top wall 41 has through-holes (not illustrated) extending in the thickness direction of the second top wall 41.

The second surrounding wall 42 is in the form of a frame. Referring to FIGS. 2 and 3, the second surrounding wall 42 has an inner peripheral surface 421, an outer peripheral surface 422, and an opening 423, which is on an end of the second surrounding wall 42. The inner peripheral surface 421 is composed of four flat faces. In the assembled state illustrated in FIG. 2, an acoustic space 302 is defined by the inner peripheral surface 421, the top wall main surface 411, and the piezoelectric diaphragm 2. That is, the acoustic space 302 is located on the second-direction side in the internal space 30.

In addition, the second pressing portion 43 is a protruding structure that includes protrusions on the four corners of the second surrounding wall 42. The second pressing portion 43 extends in the height direction (i.e., the thickness direction) of the second surrounding wall 42. In the assembled state, the first peripheral portion 13 of the piezoelectric diaphragm 2 is sandwiched between the second pressing portion 43 and the first pressing portion 33 of the case main body 3, such that the piezoelectric diaphragm 2 is fitted to (and secured to) the case 5.

The fixation portion 44 is a protruding structure on the top wall main surface 411 of the second top wall 41. In the assembled state, the fixation portion 44 and the through-holes in the second top wall 41 enable fixation of the two pin terminals 50 to the second top wall 41. Moreover, the two pin terminals 50 are kept in a proper position by the fixation portion 44 in a manner so as to be in contact with the piezoelectric diaphragm 2.

The second step 342 is provided to the second surrounding wall 42 and is located close to the opening 423. The second step 342 is composed of four projections extending inward in the widthwise direction, each of which is on the corresponding one of the four faces forming the inner peripheral surface 421. In the assembled state, the second step 342 is in positional agreement with the second peripheral portion 12 of the piezoelectric diaphragm 2. More specifically, the second step 342 extends along the second peripheral portion 12 in a manner so as to face the second main surface 112 and the first step 341. In this state, the second step 342 is not in contact with the second peripheral portion 12. That is, a clearance (e.g., a space) is left between the second step 342 and the second peripheral portion 12, as illustrated in FIG. 4. The second step 342 will be described in detail later.

Moreover, in an exemplary aspect, each of the two pin terminals 50 is a springy member obtained by bending a lead. For example, the lead is a phosphor bronze wire plated with tin (Sn). The through-holes in the second top wall 41 of the lid 4 and the fixation portion 44 of the lid 4 enable fixation of the two pin terminals 50 to the lid 4.

In the assembled state, one of the two pin terminals 50 is electrically connected to the electrode on the first-direction side of the piezoelectric member 20, where the second main surface 112 of the diaphragm 10 included in the piezoelectric diaphragm 2 is located between the electrode and the pin terminal 50. The other pin terminal 50 is electrically connected to the electrode on the second-direction side of the piezoelectric member 20. Thus, in operation, the two pin terminals 50 can be used to apply an alternating voltage to the pair of electrodes of the piezoelectric member 20 included in the piezoelectric diaphragm 2.

Details of Step 34

The step 34 will be described in detail below with reference to FIG. 4. The following describes each part of the step 34 and the positional relationship between the second peripheral portion 12 and each part of the step 34.

As illustrated in FIG. 4, the first step 341 and the second step 342 collectively forming the step 34 have the same shape in the exemplary aspect. The distance between the first step 341 and the second step 342 is greater than the thickness of the second peripheral portion 12 so as to provide the clearance described herein.

Referring to FIG. 4, the first step 341 has a first step surface 343, and the second step 342 has a second step surface 344. The first step surface 343 is oriented toward the second step 342, and the second step surface 344 is oriented toward the first step 341. The first step surface 343 and the second step surface 344 are connected to each other by the inner peripheral surface 321. In the assembled state, the first step surface 343, the second step surface 344, and the inner peripheral surface 321 are facing surfaces that are oriented toward the first main surface 111, the second main surface 112, and the side surface 113, respectively, of the second peripheral portion 12. The first step surface 343, the second step surface 344, the inner peripheral surface 321, the first main surface 111, the second main surface 112, and the side surface 113 are wall surfaces that define the clearance P.

Referring to FIG. 4, a first clearance P1, a second clearance P2, and a third clearance P3 are provided. The first clearance P1 is provided between the first step surface 343 of the first step 341 and the first main surface 111 of the second peripheral portion 12 in the thickness direction of the diaphragm 10. The third clearance P3 is provided between the second step surface 344 of the second step 342 and the second main surface 112 of the second peripheral portion 12 in the thickness direction of the diaphragm 10. The second clearance P2 is provided between the inner peripheral surface 321 of the first surrounding wall 32 and the side surface 113 of the second peripheral portion 12 in a direction in which the main surfaces of the diaphragm 10 extend. In this configuration, the second clearance P2 crosses the first clearance P1 and the third clearance P3.

The dimension of the first clearance P1 in the thickness direction of the diaphragm 10 is denoted by H1, and the dimension of the third clearance P3 in the thickness direction of the diaphragm 10 is denoted by H3. Moreover, in the exemplary aspect, the length of the first clearance P1 and the length of the third clearance P3 in the direction in which the main surfaces of the diaphragm 10 extend are each equal to L1, which denotes the length of the first step 341 (or the second step 342) in the direction in which the main surfaces of the diaphragm 10 extend. The dimension of the second clearance P2 in the direction in which the main surfaces of the diaphragm 10 extend is denoted by H2. The dimensions mentioned above are hereinafter referred to as a width H1, a width H2, a width H3, and a length L1, respectively.

The width H1 is preferably less than or equal to 0.35 mm, for example, in the first embodiment is 0.35 mm. Moreover, in an exemplary aspect, the width H3 may be greater than the width H1, for example, the width H3 can be 0.50 mm. Alternatively, the width H3 may be less than or equal to the width H1. The width H2 may be equal to the width H3. The length L1 is greater than the width H1. For example, the length L1 is preferably greater than or equal to 0.50 mm, and can be 0.80 mm in the first embodiment.

In the exemplary aspect, the first clearance P1 is not necessarily smaller than the other clearances. That is, the width H1 is not necessarily less than or equal to 0.35 mm. For example, one of the width H1, the width H2, and the width H3 is to be less than or equal to 0.35 mm. In some embodiments, any two of them or all of them are to be less than or equal to 0.35 mm. As the width H1 (or H2) is made smaller, the length L1 can be shortened correspondingly.

The step 34 and the second peripheral portion 12 are disposed in a manner so as not to be in contact with each other (i.e. a space is defined therebetween), where the first clearance P1, the second clearance P2, and the third clearance P3 are defined therebetween. When the dimensions of the first clearance P1, the second clearance P2, and the third clearance P3 conform to the conditions mentioned above, the clearance P left between the step 34 and the second peripheral portion 12 is U-shaped. The clearance P is an interface between the acoustic space 301 and the acoustic space 302 that are located on opposite sides in the thickness direction of the piezoelectric diaphragm 2. While the piezoelectric diaphragm 2 vibrates, air hardly circulates by convection between the acoustic spaces 301 and 302. This is due to the presence of the clearance P.

Effects Produced by Clearance P

Figure 5:
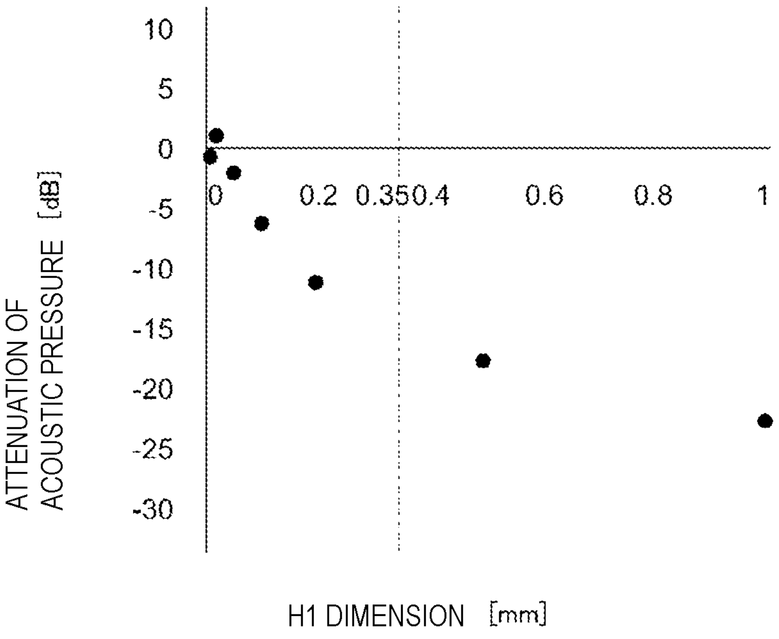
FIG. 5 illustrates the relationship between the width of a clearance in the first exemplary embodiment and the attenuation of acoustic pressure.
Figure 12:
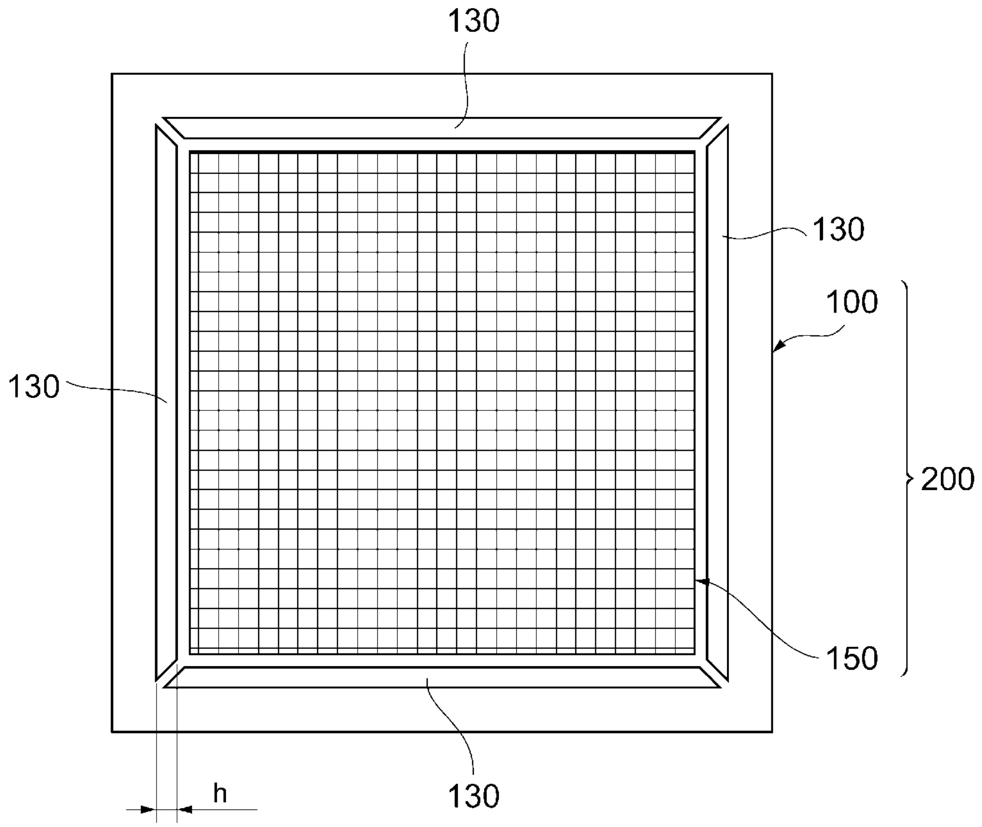
FIG. 12 illustrates a piezoelectric diaphragm in a comparative example.
Figure 13:
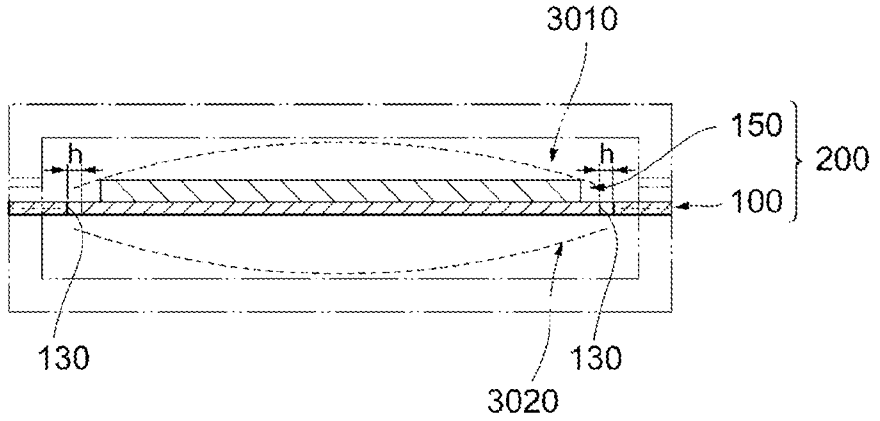
FIG. 13 illustrates a state in which the piezoelectric diaphragm in the comparative example vibrates.
Figure 14:
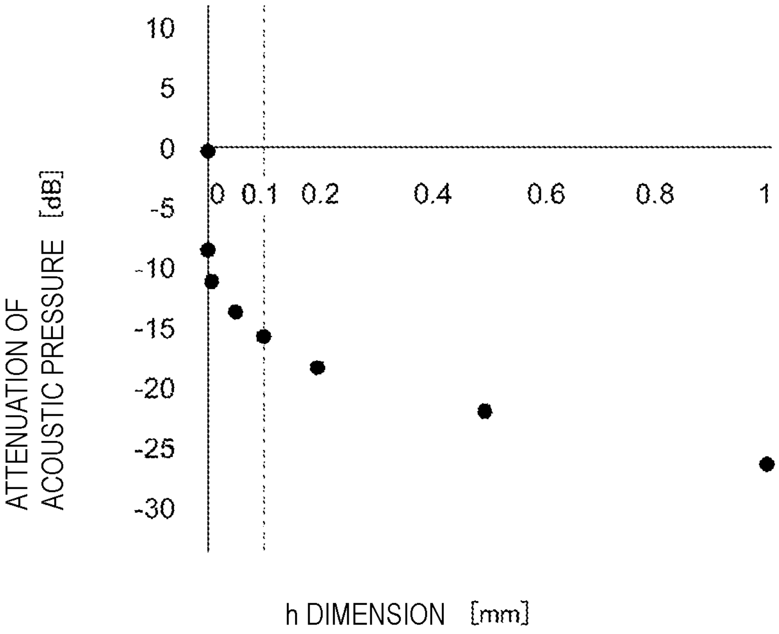
FIG. 14 illustrates the relationship between the width of slits in the comparative example and the attenuation of acoustic pressure.

The effects produced by the clearance P in the first exemplary embodiment will be described in detail below. The principle of how the air convection is suppressed by the presence of the clearance P in the first embodiment will be described with reference to FIGS. 2, 4, and 5 as well as FIGS. 12 to 14. For comparison regarding the structure for suppressing air convection, a piezoelectric sound component that is illustrated in FIGS. 12 and 13 as a comparative example will also be described with a view to clarifying the effects of the clearance P in the first embodiment. FIG. 5 illustrates the relationship between the width H1 of the first clearance P1 in the first embodiment and the attenuation of acoustic pressure. FIG. 12 illustrates a piezoelectric diaphragm 200 in a comparative example. FIG. 13 illustrates a state in which the piezoelectric diaphragm 200 in the comparative example vibrates. FIG. 14 illustrates the relationship between the width of slits 130 in the comparative example and the attenuation of acoustic pressure, where the width of each slit 130 is denoted by h.

Principle of How Air Convection Is Suppressed

The following describes the principle of how the air convection is suppressed by the presence of the clearance P in the first embodiment. The air convection is suppressed in both the first exemplary embodiment and the comparative example on the same principle.

In general, it should be appreciated that the clearance P has air inside it. Air is a low-viscosity material. In particular, the viscosity ($\mu$) of air at atmospheric temperatures and pressures (i.e., in the ordinary state) is about 0.018 mPa·s. When the piezoelectric diaphragm 2 does not vibrate, air in the clearance P is not subject to external force. That is, the viscosity of air in the ordinary state is low.

When the piezoelectric diaphragm 2 creates high-speed reciprocating vibrations in a range of, for example, 2 to 10 kHz, sheering stress (i.e., frictional stress) t is exerted on air in the clearance P. In other words, the frictional stress $\tau$ is produced between air in the clearance P and the wall surface that defines the clearance P.

Although there is no substantial fluctuation in the actual viscosity $\mu$ of air, the frictional stress $\tau$ is so great that it hinders air from flowing along the wall surface that defines the clearance P. Thus, air in the clearance P in this state can be deemed characteristically similar to high-viscosity substances. The clearance P is closed with air that is characteristically similar to high-viscosity substances such that air hardly circulates by convection between the acoustic spaces 301 and 302.

Effects Produced by Clearance P

For comparison regarding the structure for suppressing air convection, the piezoelectric sound component that is illustrated in FIGS. 12 and 13 as a comparative example will be described below with a view to clarifying the effects produced by the clearance P in the first exemplary embodiment.

The piezoelectric diaphragm 200 in the comparative example will be briefly described with reference to FIGS. 12 and 13. After that, the effects produced by the clearance P in the first embodiment will be discussed.

Referring to FIG. 12, the piezoelectric diaphragm 200 in the comparative example includes a diaphragm 100 and a piezoelectric member 150, which is provided to the diaphragm 100. The diaphragm 10 in the first embodiment and the diaphragm 100 have the same shape and are equal in thickness. As shown, the diaphragm 100 has the slits 130, whereas there are no such slits in the diaphragm 10 in the first exemplary embodiment.

Moreover, an acoustic space 3010 and an acoustic space 3020 are defined on opposite sides in the thickness direction of the piezoelectric diaphragm 200 of the piezoelectric sound component in the comparative example. The slits 130 constitute a structure for suppressing air convection. That is, the slits 130 are provided such that air hardly circulates by convection between the acoustic spaces 3010 and 3020. As illustrated in FIG. 13, the slits 130 are through-slits formed in the thickness direction of the diaphragm 100. The width and the length of each slit 130 are denoted by h and l, respectively. The width h of each slit 130 is 0.10 mm, and the length l of each slit 130 (i.e., the thickness of the diaphragm 100) is 0.05 mm. In the first embodiment, the width H1 of the first clearance P1, which is narrower than any other clearances forming the clearance P, is 0.35 mm, and the length L1 of the first clearance P1 is 0.80 mm.

FIG. 5 illustrates acoustic pressure attenuation provided by the clearance P1 in the first embodiment, and FIG. 14 illustrates acoustic pressure attenuation provided by the slits 130 in the comparative example. As can be seen from FIGS. 5 and 14, the attenuation of acoustic pressure is as low as 15 dB in both the first embodiment and the comparative example, where the piezoelectric diaphragm 2 of the piezoelectric sound component 1 according to the first embodiment and the piezoelectric diaphragm 200 of the piezoelectric sound component in the comparative example vibrate under the same condition (e.g., at the same temperature, pressure, and vibration speed) to generate sound. The extent to which air convection is suppressed by the first clearance P1 in the first embodiment is substantially equal to the extent to which air convection is suppressed by the slits 130 in the comparative example. The adoption of the first clearance P1 in the first embodiment enables the piezoelectric sound component 1 to operate without impairment of acoustic conversion efficiency.

The width H1 of the first clearance P1 in the first embodiment is 3.5 times the width h of each slit 130 in the comparative example, where the width H1 is 0.35 mm, and the width h is 0.10 mm. It is commonly known that air in a clearance or slit of greater width is less characteristically similar to high-viscosity substances. In the first embodiment, this inconvenience is resolved by increasing the length L1 of the first clearance P1. Although the width H1 of the first clearance P1 in the first embodiment is great, air in the first clearance P1 is characteristically similar to high-viscosity substances. The length (or widthwise) direction of the first clearance P1 in the first embodiment coincides with the direction in which the main surfaces of the piezoelectric diaphragm 2 extend. This configuration enables an increase in the length L1 of the first clearance P1.

In the comparative example, there is a limitation to the length of the slits 130 in the thickness direction of the diaphragm 100. That is, the length of such a clearance is not allowed to exceed the thickness of the diaphragm 100. This inconvenience is resolved by bringing the length direction of the first clearance P1 into agreement with the direction in which the main surfaces of the piezoelectric diaphragm 2 extend. For example, the length L1 of the first clearance P1 in the first embodiment is as much as 16 times the length l of each slit 130 in the comparative example, where the length L1 is 0.80 mm, and the length l is 0.05 mm. Similarly, the width H1 of the first clearance P1 in the first embodiment may be great. For example, the width H1 in the first embodiment is greater than the width h of each slit 130 in the comparative example, where the width H1 is 0.35 mm, and the width h is 0.10 mm. If there is some misalignment of the piezoelectric diaphragm 2, this would cause little deviation from the desired width H1. Thus, the piezoelectric sound component 1 is configured to operate with little variation in acoustic pressure characteristics.

Moreover, the first clearance P1 is defined by the second peripheral portion 12 of the diaphragm 10 and the first step 341 included in the step 34. Unlike the slits 130 in the comparative example, this clearance is formed without the need to cut slits in the diaphragm 10. Thus, the piezoelectric diaphragm 2 in the first embodiment is simpler and easier to fabricate than the slits 130 in the comparative example. The structural simplicity and the ease of forming clearances reduce the necessity for contrivance in the production of the piezoelectric diaphragm 2 and the piezoelectric sound component 1 and enable a reduction in their production cost. That is, the piezoelectric diaphragm 2 has no slits and thus has enhanced strength.

In the comparative example, vibration of the piezoelectric diaphragm 200 causes deformation of the diaphragm 10 (as denoted by broken lines in FIG. 13). As a result, the slits 130 can also become deformed and can increase in width such that the function of suppressing air convection would be impaired during operation. The piezoelectric diaphragm 2 in the first embodiment has no slits. Thus, the problem associated with the deformation of the slits 130 in the comparative example is averted. In other words, the function of suppressing air convection is unaffected in the first exemplary embodiment. The first clearance P1 and the third clearance P3 are provided on opposite sides in the thickness direction of the piezoelectric diaphragm 2. When the piezoelectric diaphragm 2 becomes deformed in its thickness direction, the first clearance P1 or the third clearance P3 decreases in width. The decrease in the width of either of these clearances eliminates or reduces the possibility that the function of suppressing air convection will be impaired.

Clearances other than the first clearance P1 are also provided in the first embodiment. More specifically, the second clearance P2 and the third clearance P3 are connected to the first clearance P1. These clearances form the clearance P, which is U-shaped around the sides of the second peripheral portion 12. The U-shaped clearance P may be long in its entirety, thus enabling a further increase in the frictional stress $\tau$ produced between air in the clearance P and the wall surface that defines the clearance P. The adoption of the U-shaped clearance further reduces the possibility that air will circulate by convection between the acoustic spaces 301 and 302 on opposite sides of the clearance P. The clearance P in the first embodiment therefore enables the piezoelectric sound component 1 to exhibit excellent characteristics in relation to acoustic pressure.

Moreover, the piezoelectric diaphragm 2 in the first exemplary embodiment is fitted to the case 5 in such a manner that only the first peripheral portion 13 is fixed to the case 5. In other words, the four corners of the diaphragm 10 are fixed to the case 5. The vibration part V, that is, the piezoelectric diaphragm 2 except for the first peripheral portion 13 is movable relative to the case 5. Thus, the fixed portions have little effect on the vibratory displacement of the vibration part V. The piezoelectric diaphragm 2 that has no slits can vibrate as much as the piezoelectric diaphragm 200 having the slits 130 in the comparative example does. The structural simplicity of the piezoelectric diaphragm 2 is achieved, and the piezoelectric sound component 1 according to the first embodiment can operate without impairment of acoustic conversion efficiency.

In the first embodiment, the clearance P defined by the step 34 and the second peripheral portion 12 offers the features described above. With the structural simplicity, the piezoelectric sound component according to the present invention exhibits excellent characteristics in relation to acoustic pressure without impairment of acoustic conversion efficiency.

Second Exemplary Embodiment

Figure 6:
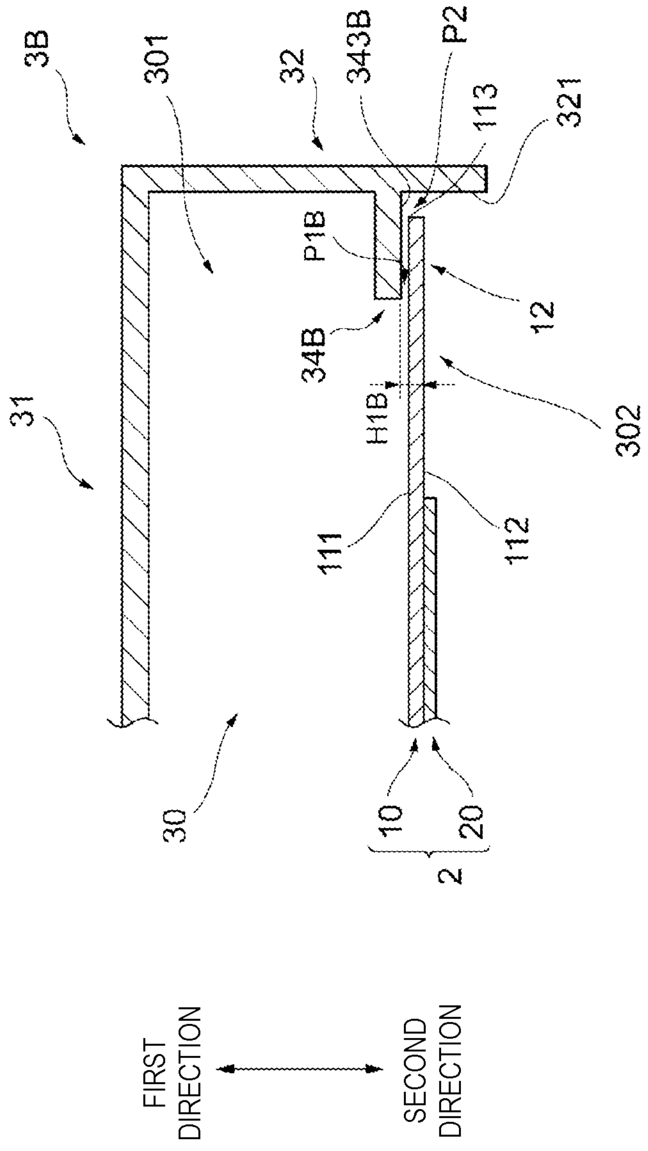
FIG. 6 is a sectional view of a piezoelectric sound component according to a second exemplary embodiment.
Figure 7:
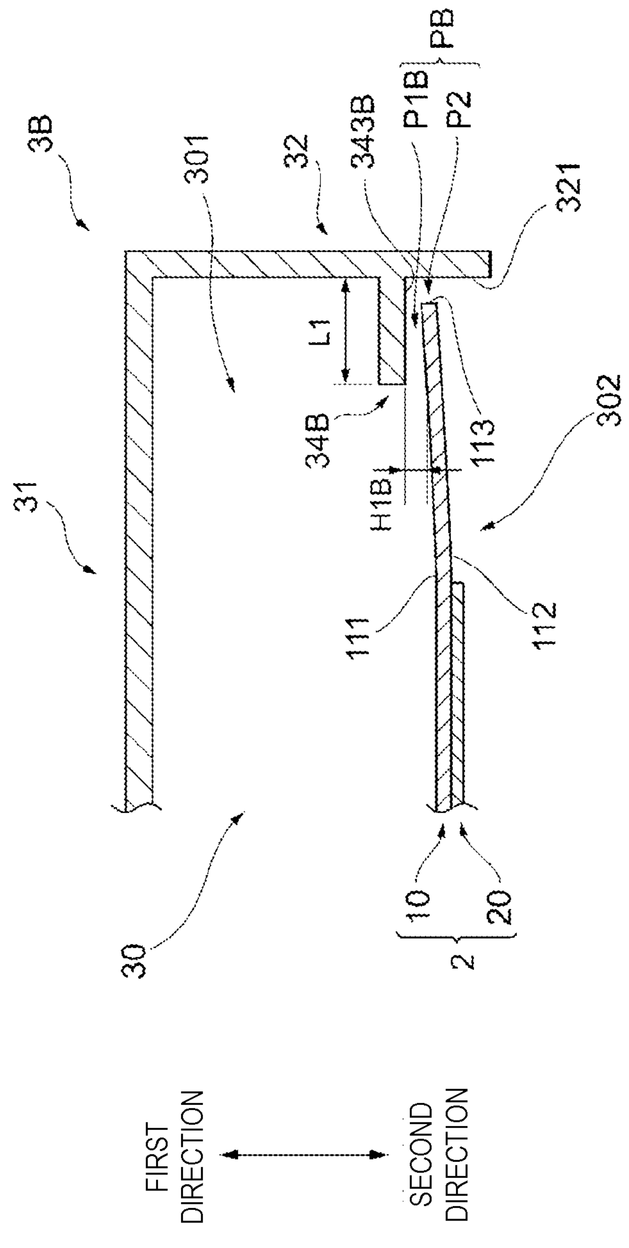
FIG. 7 is a sectional view of the piezoelectric sound component, illustrating a state in which a piezoelectric diaphragm in the second exemplary embodiment slides.

A step 34B in a second exemplary embodiment will be described below with reference to FIGS. 6 and 7. FIG. 6 is a sectional view of a piezoelectric sound component according to the second embodiment. FIG. 7 is a sectional view of the piezoelectric sound component, illustrating elements of the piezoelectric sound component in a state in which the piezoelectric diaphragm 2 in the second embodiment slides.

Description of features common to the first exemplary embodiment and the second exemplary embodiment will be omitted, and the second embodiment will be described with regard to only its distinctive feature or, more specifically, the step 34B. The following describes each part of the step 34B and the positional relationship between the piezoelectric diaphragm 2 and each part of the step 34B. Similar effects attributable to similar configurations will not be delt with in the following description. The same holds true for third to sixth embodiments, which will be described later.

Differing from the step 34 in the first embodiment, the step 34B in the second embodiment is provided to only a case main body 3B (see FIG. 6). In particular, the step 34B may be provided to only a lid 4B, not to the case main body 3B. The step 34B is provided in a manner so as to face the first main surface 111 of the piezoelectric diaphragm 2.

In the second exemplary embodiment, the first main surface 111 of the second peripheral portion 12 is not in contact with a first step surface 343B of the step 34B (see FIG. 6) when the piezoelectric diaphragm 2 is not vibrating. In this state, a first clearance PIB is provided between the first step surface 343B of the step 34B and the first main surface 111 of the second peripheral portion 12. The first clearance PIB and the second clearance P2 form a clearance PB, which is L-shaped. It is noted that H1B denotes the width of the first clearance PIB in the thickness direction of the piezoelectric diaphragm 2. The width H1B is less than or equal to 0.35 mm in the exemplary aspect.

Moreover, the piezoelectric diaphragm 2 in the second embodiment can be disposed in such a manner that the first main surface 111 is in contact with the first step surface 343B of the step 34B when the piezoelectric diaphragm 2 does not vibrate. In other words, the width H1B of the first clearance PIB may be 0.00 mm in this exemplary aspect. When the piezoelectric diaphragm 2 vibrates in the second direction, the first main surface 111 of the piezoelectric diaphragm 2 moves away from the first step surface 343B of the step 34B (see FIG. 7). As a result, the width H1B of the first clearance PIB increases. The maximum value of the width H1B of the first clearance PIB is less than or equal to 0.35 mm.

It is noted that the second exemplary embodiment in which the step 34B and the second peripheral portion 12 are arranged as described above produces the effects similar to those produced by the first embodiment while the structural simplicity of the step is achieved. The piezoelectric diaphragm 2 may be in contact with the step 34B when the piezoelectric diaphragm 2 does not vibrate. This configuration enables the piezoelectric diaphragm 2 to be fitted to the case main body 3 with greater ease and stability.

Third Exemplary Embodiment

A step 34C in a third exemplary embodiment will be described below with reference to FIG. 8. In particular, FIG. 8 is a sectional view of a piezoelectric sound component according to the third embodiment.

Figure 8:
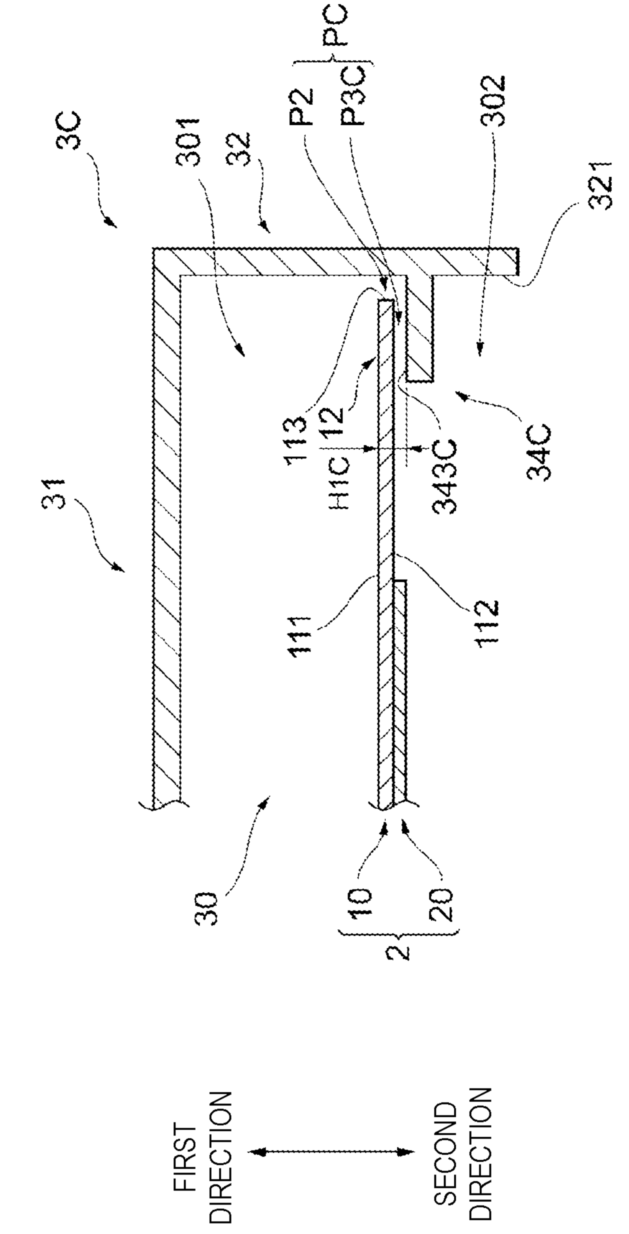
FIG. 8 is a sectional view of a piezoelectric sound component according to a third exemplary embodiment.

Differing from the step 34 in the first embodiment, the step 34C in the third embodiment is provided only on a case main body 3C (see FIG. 8). Moreover, the step 34C can be provided only on a lid 4C and not on the case main body 3C. As further shown, the step 34C is provided in a manner so as to face the second main surface 112 of the piezoelectric diaphragm 2.

In the third embodiment, the piezoelectric diaphragm 2 or, more specifically, the second main surface 112 of the second peripheral portion 12 is not in contact with a second step surface 343C of the step 34C (see FIG. 8) when the piezoelectric diaphragm 2 is not vibrating. In this state, the second clearance P2 is provided between the inner peripheral surface 321 and the side surface 113 of the second peripheral portion 12, and a third clearance P3C is provided between the second step surface 343C of the step 34C and the second main surface 112 of the second peripheral portion 12. The second clearance P2 and the third clearance-P3C define a clearance PC, which is L-shaped. H1C denotes the width of the third clearance P3C in the thickness direction of the piezoelectric diaphragm 2. The width H1C is less than or equal to 0.35 mm.

Moreover, the piezoelectric diaphragm 2 in the third embodiment may be disposed in such a manner that the second main surface 112 is in contact with the second step surface 343C of the step 34C when the piezoelectric diaphragm 2 is not vibrating. In other words, the width H1C of the third clearance P3C may be 0.00 mm in an exemplary aspect. When the piezoelectric diaphragm 2 vibrates in the first direction, the second main surface 112 of the piezoelectric diaphragm 2 moves away from the second step surface 343C of the step 34C. As a result, the width H1C of the third clearance P3C increases. The maximum value of the width H1C of the third clearance P3C is less than or equal to 0.35 mm in the exemplary aspect.

The third embodiment in which the step 34C and the second peripheral portion 12 are configured as described above produces the effects similar to those produced by the first embodiment while the structural simplicity of the step is achieved.

Fourth Exemplary Embodiment

Figure 9:
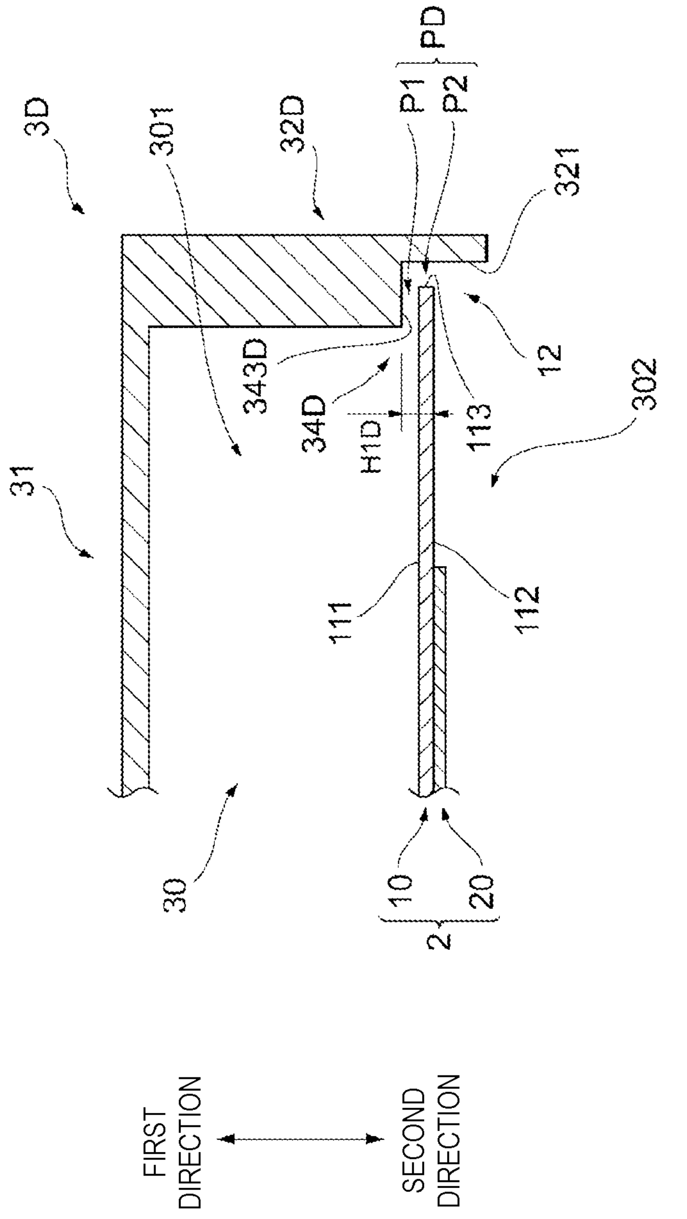
FIG. 9 is a sectional view of a piezoelectric sound component according to a fourth exemplary embodiment.

A step 34D in a fourth exemplary embodiment will be described below with reference to FIG. 9. FIG. 9 is a sectional view of a piezoelectric sound component according to the fourth embodiment.

Differing from the step 34 in the first embodiment, the step 34D in the fourth embodiment is a recess of a first surrounding wall 32D of a case main body 3D (see FIG. 9). The step 34D is provided in a manner so as to face the first main surface 111, that is, only one of the main surfaces of the piezoelectric diaphragm 2. In this state, the first clearance P1 is provided between a first step surface 343D of the step 34D and the first main surface 111 of the second peripheral portion 12, and the second clearance P2 is provided between the inner peripheral surface 321 and the side surface 113 of the second peripheral portion 12. The first clearance P1 and the second clearance P2 define a clearance PD, which is L-shaped. Moreover, HID denotes the width of the first clearance P1 in the thickness direction of the piezoelectric diaphragm 2 and the width H1D is less than or equal to 0.35 mm in the exemplary aspect.

The fourth embodiment in which the step 34D and the second peripheral portion 12 are configured as described above produces the effects similar to those produced by the first embodiment while the step 34D is part of the first surrounding wall 32D of the case main body 3D. The structural simplicity of the step 34D and the case main body 3D is achieved accordingly, and the case has added strength.

Fifth Exemplary Embodiment

Figure 10:
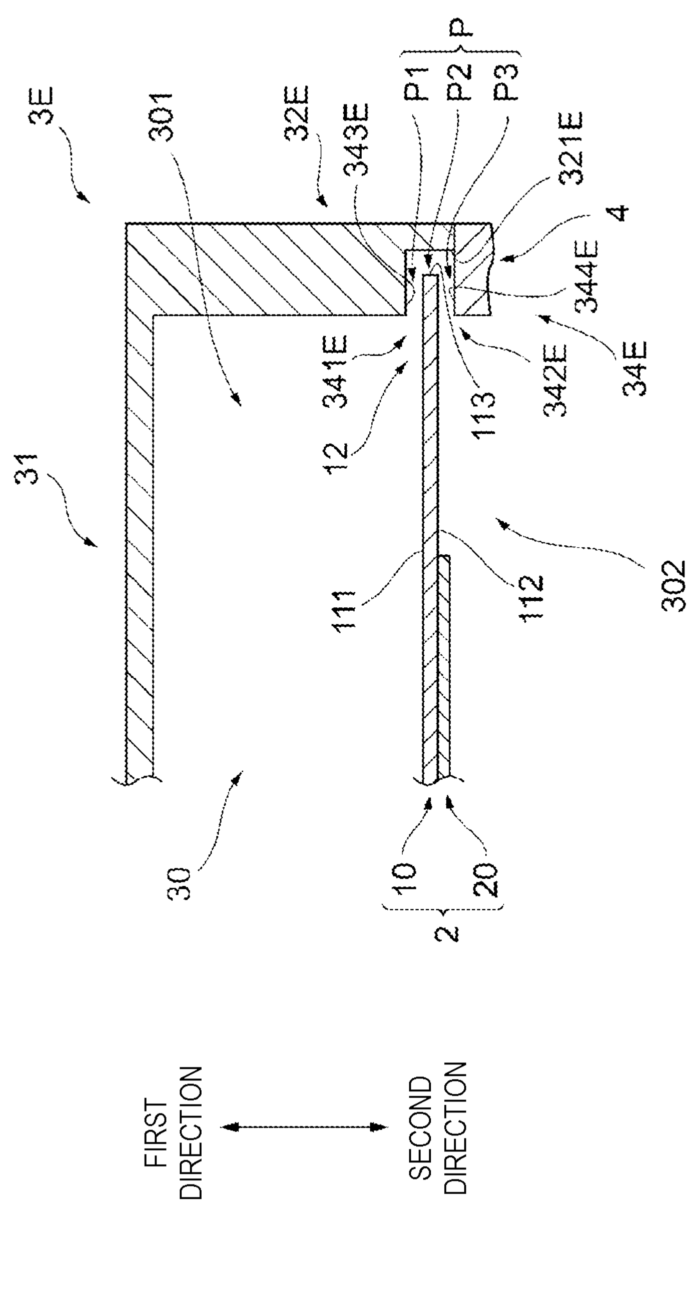
FIG. 10 is a sectional view of a piezoelectric sound component according to a fifth exemplary embodiment.

A step 34E in a fifth embodiment will be described below with reference to FIG. 10. FIG. 10 is a sectional view of a piezoelectric sound component according to the fifth embodiment.

Differing from the step 34 in the first embodiment, the step 34E in the fifth embodiment is a recess of a first surrounding wall 32E of case main body 3E (see FIG. 10). The step 34E is provided on opposite sides in the thickness direction of the piezoelectric diaphragm 2. More specifically, the step 34E includes a first step 341E and a second step 342E. The first step 341E is provided from the case main body 3E. The second step 342E is provided from the lid 4. The first clearance P1 is provided between a first step surface 343E of the first step 341E and the first main surface 111 of the second peripheral portion 12, and the second clearance P2 is provided between an inner peripheral surface 321E and the side surface 113 of the second peripheral portion 12. Moreover, the third clearance P3 is provided between a second step surface 344E of the second step 342E and the second main surface 112 of the second peripheral portion 12. The dimensions of the first clearance P1, the second clearance P2, and the third clearance P3 in the fifth embodiment are as described in relation to the clearance P in the first embodiment. The clearance P in the fifth embodiment defined by the first clearance P1, the second clearance P2, and the third clearance P3 is U-shaped and is geometrically analogous to the clearance P in the first embodiment as described above.

The fifth embodiment in which the step 34E and the second peripheral portion 12 are configured as described above produces the effects similar to those produced by the first embodiment while the step 34E is part of the first surrounding wall 32E of the case main body 3E. The structural simplicity of the case main body 3E is achieved accordingly, and the case has added strength.

Sixth Exemplary Embodiment

Figure 11:
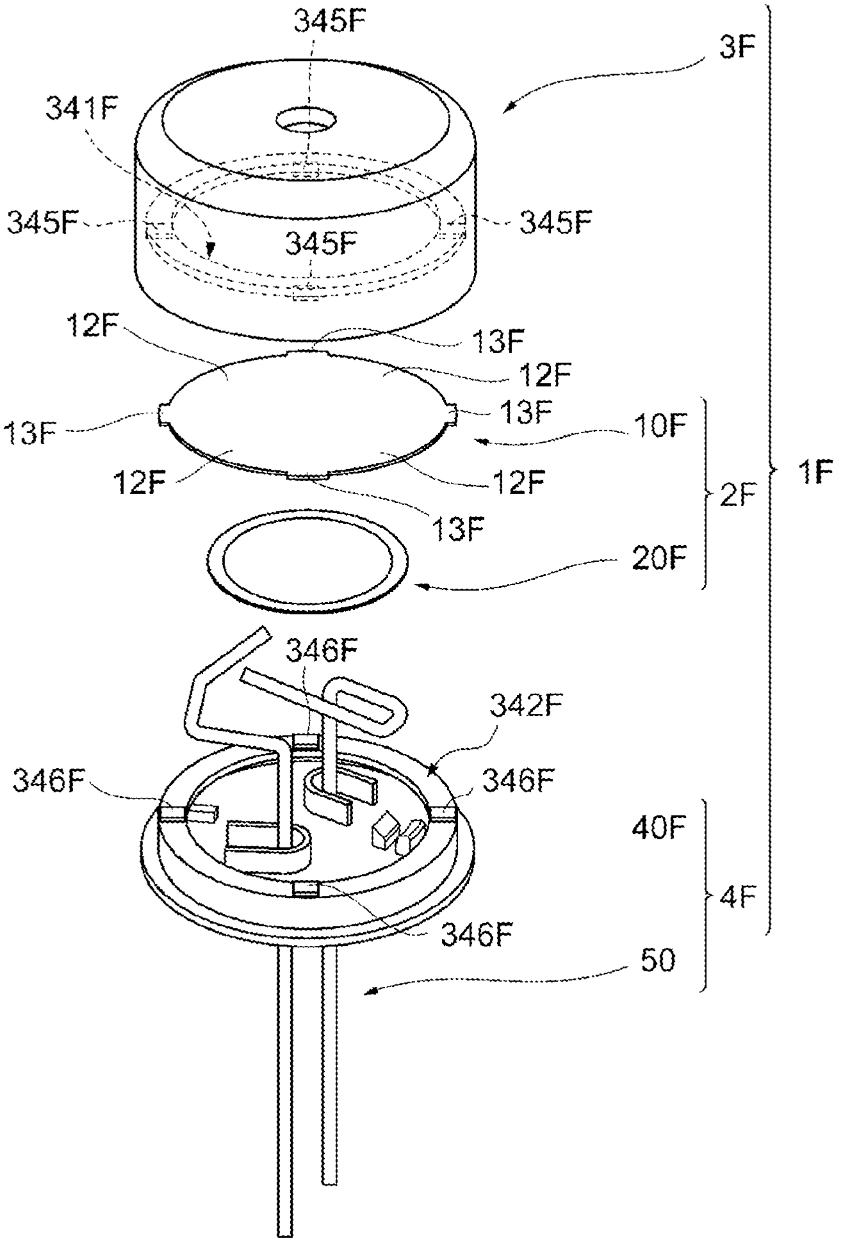
FIG. 11 is an exploded perspective view of a piezoelectric sound component according to a sixth exemplary embodiment.

A piezoelectric sound component 1F in a sixth embodiment will be described below with reference to FIG. 11. FIG. 11 is an exploded perspective view of the piezoelectric sound component 1F according to the sixth embodiment.

Each of the case main body 3, the lid 4, the diaphragm 10, the first step 341 provided to the case main body 3, and the second step 342 provided to the lid 4 in the first embodiment and the corresponding member or portion in the sixth embodiment are geometrically different from each other in the plan view. Referring to FIG. 11, a case main body 3F, a lid 4F, and a diaphragm 10F each have main surfaces that are circular when viewed in plan. A first step 341F and a second step 342F are provided from the case main body 3F and the lid 4F, respectively, and are annular when viewed in plan. The case main body, the lid, the diaphragm, the first step, and the second step in the sixth embodiment are as described in relation to the first embodiment except for their planar shapes. The piezoelectric sound component 1F according to the sixth embodiment is otherwise structurally identical to the piezoelectric sound component 1 according to the first embodiment as described above.

As further shown, the diaphragm 10F in the sixth embodiment includes a second peripheral portion 12F and four first peripheral portions 13F, which are provided to the circular periphery of the second peripheral portion 12F. The first step 341F is provided with four pressing portions 345F, which are in positional agreement with the four first peripheral portions 13F. The second step 342F is provided with four pressing portions 346F, which are in positional agreement with the four first peripheral portions 13F. In the assembled state, each of the first peripheral portions 13F is sandwiched between the corresponding pressing portion 345F and the corresponding pressing portion 346F and is fixed to the case. The second peripheral portion 12F is movable relative to the case. It is also noted that in different refinements of the exemplary embodiment, the number of the first peripheral portions 13F, the number of pressing portions 345F for fixation of the first peripheral portions 13F, and the number of pressing portions 346F for fixation of the first peripheral portions 13F can each be greater or less than four.

The sixth embodiment in which the piezoelectric sound component 1F is as described above produces the effects similar to those produced by the first embodiment while a higher degree of flexibility in the appearance design of the piezoelectric sound component 1F is achieved.

Embodiments that have been described so far are presented as examples of the present invention. The piezoelectric sound component 1 according to an exemplary embodiment of the present invention includes the piezoelectric diaphragm 2 and the case 5. The piezoelectric diaphragm 2 includes the diaphragm 10 and the piezoelectric member 20. The diaphragm 10 has the middle portion 11 and the peripheral portion 15 that surrounds the middle portion 11 with the piezoelectric member 20 being disposed on the middle portion 11. The case 5 has the internal space 30. The piezoelectric diaphragm 2 is disposed in the internal space 30. The peripheral portion 15 of the diaphragm 10 includes the first peripheral portion 13 and the second peripheral portion 12. The first peripheral portion 13 is fixed to the case 5 and the second peripheral portion 12 is movable relative to the case 5. The case 5 includes the step 34, which is in positional agreement with the second peripheral portion 12 in the thickness direction of the diaphragm 10. The step 34 and the second peripheral portion 12 define the clearance P therebetween.

With such structural simplicity, the piezoelectric sound component according to the present invention exhibits excellent characteristics in relation to acoustic pressure without impairment of acoustic conversion efficiency.

Moreover, it is noted that the step 34 may be a projection or a recess of the surrounding wall of the case 5.

The structural simplicity of the step is achieved accordingly.

In addition, the case 5 may include the case main body 3 and the lid 4. The case main body 3 has an opening 323 and is fitted with the lid 4 in such a manner that the opening 323 is closed with the lid 4. The case main body 3 may include the first top wall 31 and the first surrounding wall 32. The first top wall 31 faces the first main surface 111 of the diaphragm 10. The first surrounding wall 32 is on an end portion of the first top wall 31. The lid 4 may include the second top wall 41 and the second surrounding wall 42. The second top wall 41 faces the second main surface 112 of the diaphragm 10. The second surrounding wall 42 is on an end portion of the second top wall 41. The step 34 may also include the first step 341. The first step 341 extends along the second peripheral portion 12 in a manner so as to face the first main surface 111 in the thickness direction. The first step 341 may be provided to the first surrounding wall 32 or the second surrounding wall 42. The clearance P may include the first clearance P1. The first clearance P1 is provided between a surface of the second peripheral portion 12 and a surface of the first step 341, with the surfaces being oriented toward each other in the thickness direction.

The first clearance extends in the direction in which the main surfaces of the diaphragm extend. According to this configuration, air hardly circulates by convection between spaces on opposite sides in the thickness direction of the diaphragm through the first clearance.

In another exemplary aspect, the surface of the second peripheral portion 12 may be the first main surface 111 of the diaphragm 10, and the surface that is oriented toward the surface of the second peripheral portion 12 in the thickness direction may be a facing surface of the first step 341. The facing surface is oriented toward the first main surface 111 and is herein referred to as the first step surface 343. The first clearance P1 may be defined by the first main surface 111 of the diaphragm 10 and the first step surface 343 of the first step 341 in a state in which the first main surface 111 of the diaphragm 10 is not in contact with the first step surface 343 of the first step 341. Alternatively, the first clearance P1 may be created between the first main surface 111 of the diaphragm 10 and the first step surface 343 of the first step 341 when the piezoelectric diaphragm 2 vibrates in a state in which the first main surface 111 of the diaphragm 10 is in contact with the first step surface 343 of the first step 341.

In this configuration, the first clearance can be created before or when the diaphragm vibrates. This feature provides additional degrees of flexibility in the design concerning the first clearance and eliminates or reduces the possibility that the piezoelectric sound component will change in characteristics in relation to acoustic pressure due to air convection.

Yet further, the width H1 of the first clearance P1 in the thickness direction may be the distance between the first main surface 111 of the diaphragm 10 and the first step surface 343 of the first step 341. The width H1 of the first clearance P1 may be less than or equal to 0.35 mm in this exemplary aspect.

With the first clearance extending in the direction in which the main surfaces of the diaphragm extend, the width of the first clearance may be small. It is thus ensured that air hardly circulates by convection between spaces on opposite sides in the thickness direction of the diaphragm through the first clearance. This feature configures the piezoelectric sound component to exhibit improved characteristics in relation to acoustic pressure.

The length L1 of the first clearance P1 in the direction in which the main surfaces of the diaphragm 10 extend may be the length of the first step 341 in the direction in which main surfaces of the first step 341 extend. The length L1 may be greater than the width H1 of the first clearance P1.

It is thus ensured that the first clearance is long enough to improve the effect of suppressing air convection through the first clearance.

Moreover, the clearance P may include the second clearance P2. The second clearance P2 is provided between two surfaces oriented toward each other. One of the surfaces oriented toward each other is the surface of the first surrounding wall 32 or the second surrounding wall 42, whichever is fitted with the first step 341. The other surface is a surface of the second peripheral portion 12.

The second clearance extends in the direction that forms an angle with the direction in which the main surfaces of the diaphragm extend. It is thus ensured that the clearance is long enough to improve the effect of suppressing air convection through the clearance.

In addition, the second clearance P2 may be defined by the side surface 113 of the second peripheral portion 12 and an inner peripheral surface of the first surrounding wall 32 or the second surrounding wall 42, whichever is fitted with the first step 341. The first clearance P1 and the second clearance P2 may be connected in a manner so as to cross each other.

These clearances form an L-shaped clearance, which improves the effect of suppressing air convection.

Moreover, the step 34 may include the second step 342 in addition to the first step 341. The second step 342 extends along the second peripheral portion 12 in a manner so as to face the second main surface 112 in the thickness direction. The second step 342 is provided to the first surrounding wall 32 or the second surrounding wall 42, whichever is not fitted with the first step 341. The second step 342 faces the first step 341. The clearance P may include the third clearance P3. The third clearance P3 is provided between a surface of the second step 342 and a surface of the second peripheral portion 12, with the surfaces being oriented toward each other in the thickness direction.

The third clearance extends in the direction in which the main surfaces of the diaphragm extend. This configuration further increases the length of the clearance, thus improving the effect of suppressing air convection through the clearance.

In another exemplary aspect, the surface of the second peripheral portion 12 may be the second main surface 112 of the diaphragm 10, and the surface that is oriented toward the surface of the second peripheral portion 12 in the thickness direction may be a facing surface of the second step 342. The facing surface of the second step 342 is oriented toward the second main surface 112 and is herein referred to as the second step surface 344. The third clearance P3 may be defined by the second main surface 112 of the diaphragm 10 and the second step surface 344 of the second step 342. The second clearance P2 and the third clearance P3 may be connected in a manner so as to cross each other.

These clearances form a U-shaped clearance, which improves the effect of suppressing air convection and configures the piezoelectric sound component to exhibit excellent characteristics in relation to acoustic pressure.

The width H3 of the third clearance P3 in the thickness direction may be the distance between the second main surface 112 of the diaphragm 10 and the second step surface 344 of the second step 342. The width H3 of the third clearance P3 may be greater than the width H1 of the first clearance P1.

The first clearance has a small width, whereas the width of the third clearance in the thickness direction is greater than the width of the first clearance. This feature provides ease of forming the step and fitting the diaphragm into the step while ensuring the effect of suppressing air convection through the clearance.

As further described above, the main surfaces of the diaphragm 10 may be circular or rectangular when viewed in plan.

This feature provides a higher degree of flexibility in the design of the diaphragm.

Yet further, the first peripheral portion 13 may include two or more portions that are fixed to the case 5.

The diaphragm is more securely fitted to the case such that the piezoelectric sound component exhibits its characteristics in relation to acoustic pressure with greater stability.

In a case where the main surfaces of the diaphragm 10 are rectangular when viewed in plan, the first peripheral portion 13 may include four corners of the diaphragm 10.

This feature enables more secure fit of the diaphragm, with the fixed portions having little effect on the vibration part. Thus, the piezoelectric sound component can operate without impairment of acoustic conversion efficiency.

In general, the exemplary embodiments above have been described to facilitate the understanding of the present invention and should not be construed as limiting the scope of the present invention. The present invention may be altered and/or modified without departing from the spirit of the present invention and embraces equivalence of such alterations and modifications. That is, the embodiments with design changes made as appropriate by those skilled in the art fall within the scope of the present invention as long as the features of the present invention are involved. For example, components in the embodiments above and the arrangement, materials, conditions, shapes, and sizes of the components are not limited to those mentioned in the description and may be changed as appropriate. The embodiments described herein are merely examples. Needless to say, partial replacements or combinations of configurations illustrated according to different embodiments are possible and fall within the scope of the present invention as long as the features of the present invention are involved.

REFERENCE SIGNS LIST

1 piezoelectric sound component
2 piezoelectric diaphragm
3 case main body
4 lid
5 case
10 diaphragm
11 middle portion
12 second peripheral portion
13 first peripheral portion
15 peripheral portion
20 piezoelectric member
30 internal space
31 first top wall
32 first surrounding wall
34 step
P clearance
50 pin terminal

The invention claimed is:

1. A piezoelectric sound component, comprising:
a case having an internal space; and
a piezoelectric diaphragm disposed in the internal space of the case and including a diaphragm and a piezoelectric member, the diaphragm having a middle portion and a peripheral portion that surrounds the middle portion with the piezoelectric member disposed on the middle portion,
wherein the peripheral portion of the diaphragm includes a first peripheral portion fixed to the case and a second peripheral portion movable relative to the case,
wherein the case includes a step that is in positional agreement with the second peripheral portion in a thickness direction of the diaphragm, and
wherein the step and the second peripheral portion define a clearance therebetween.

2. The piezoelectric sound component according to claim 1, wherein the step is a projection or a recess of the case that extends in a widthwise direction that is perpendicular to the thickness direction.

3. The piezoelectric sound component according to claim 1, wherein:
the case includes a lid and a case main body that has an opening and is fitted with the lid, such that the opening is closed with the lid,
the case main body includes a first top wall facing a first main surface of the diaphragm and a first surrounding wall on an end of the first top wall,
the lid includes a second top wall facing a second main surface of the diaphragm that opposes the first main surface and a second surrounding wall on an end of the second top wall,
the step includes a first step that extends along the second peripheral portion in a manner to face the first main surfaces in the thickness direction,
the first step extends from one of the first surrounding wall and the second surrounding wall, and
the clearance includes a first clearance that is provided between a surface of the second peripheral portion and a surface of the first step, with the respective surfaces being oriented toward each other in the thickness direction.

4. The piezoelectric sound component according to claim 3, wherein:
the surface of the second peripheral portion is either the first or second main surface of the diaphragm, and
the surface that is oriented toward the surface of the second peripheral portion is a facing surface of the first step that is oriented toward the diaphragm.

5. The piezoelectric sound component according to claim 4, wherein the first clearance is defined by the first main surfaces of the diaphragm and the facing surface of the first step in a state in which the first main surface of the diaphragm is not in contact with the facing surface of the first step, or the first clearance is created between the first main surface of the diaphragm and the facing surface of the first step when the piezoelectric diaphragm vibrates in a state in which the first main surface of the diaphragm is in contact with the facing surface of the first step.

6. The piezoelectric sound component according to claim 5, wherein:

the first clearance in the thickness direction has a width that is a distance between the first main surface of the diaphragm and the facing surface of the first step, and the width of the first clearance is less than or equal to 0.35 mm.

7. The piezoelectric sound component according to claim 6, wherein:

the first clearance has a length in a direction in which the first and second main surfaces of the diaphragm extend that is a length of the first step in a direction in which main surfaces of the first step extend, and the length is greater than or equal to the width of the first clearance.

8. The piezoelectric sound component according to claim 4, wherein:

the clearance includes a second clearance that is provided between two surfaces oriented toward each other in a direction in which the first and second main surfaces of the diaphragm extend, and one of the surfaces oriented toward each other is a surface of one of the first surrounding wall or the second surrounding wall that is fitted with the first step, and the other surface is a surface of the second peripheral portion.

9. The piezoelectric sound component according to claim 8, wherein:

the second clearance is defined by a side surface of the second peripheral portion and an inner peripheral surface of the one of the first surrounding wall or the second surrounding wall that is fitted with the first step, and the first clearance and the second clearance are connected so as to cross each other.

10. The piezoelectric sound component according to claim 4, wherein:

the step includes a second step that extends along the second peripheral portion in a manner so as to face the second main surface in the thickness direction, the second step is provided to the first surrounding wall or the second surrounding wall that is not fitted with the first step, the second step faces the first step, and the clearance includes a third clearance that is provided between a surface of the second step and a surface of the second peripheral portion, with the surfaces being oriented toward each other in the thickness direction.

11. The piezoelectric sound component according to claim 10, wherein:

the surface of the second peripheral portion is the second main surface of the diaphragm, the surface that is oriented toward the surface of the second peripheral portion in the thickness direction is a facing surface of the second step, the facing surface of the second step is oriented toward the second main surface of the diaphragm, the third clearance is defined by the second main surface of the diaphragm and the facing surface of the second step, and the third clearance and a second clearance are connected so as to cross each other, with the second clearance being defined by a side surface of the second peripheral portion and an inner peripheral surface of the first surrounding wall or the second surrounding wall that is fitted with the second step.

12. The piezoelectric sound component according to claim 11, wherein:

the third clearance has a width in the thickness direction that is a distance between the second main surface of the diaphragm and the facing surface of the second step, and the width of the third clearance is greater than the width of the first clearance.

13. The piezoelectric sound component according to claim 1, wherein the diaphragm comprises first and second main surfaces that oppose each other and are either circular or rectangular in a plan view thereof.

14. The piezoelectric sound component according to claim 1, wherein the first peripheral portion includes two or more portions that are fixed to the case.

15. The piezoelectric sound component according to claim 14, wherein the diaphragm comprises opposing main surfaces that are rectangular in a plan view thereof, and the first peripheral portion includes four corners of the diaphragm that are fixed to the case.

16. The piezoelectric sound component according to claim 1, wherein the positional agreement between the step and the second peripheral portion comprises the step overlapping the second peripheral portion in the thickness direction of the diaphragm.

17. A piezoelectric sound component, comprising:

a case having an internal space; and a piezoelectric diaphragm disposed in the internal space of the case and including a diaphragm and a piezoelectric member disposed on a main surface of the diaphragm, wherein the diaphragm comprises a rectangular shape in a plan view of the main surface and includes a peripheral portion that extends along sides of the rectangular shape of the diaphragm, wherein corners of the peripheral portion of the diaphragm are fixed to the case and sides of the peripheral portion between the corners are movable relative to the case, wherein the case includes a step that overlaps at least a portion of the sides of the peripheral portion in a thickness direction of the diaphragm, and wherein a space is provided between the step and the peripheral portion.

18. The piezoelectric sound component according to claim 17, wherein the step is a projection or a recess of the case that extends in a widthwise direction that is perpendicular to the thickness direction.

19. The piezoelectric sound component according to claim 17, wherein:

the case includes a lid and a case main body that has an opening and is fitted with the lid, the case main body includes a first top wall facing the diaphragm and a first surrounding wall on an end of the first top wall, the lid includes a second top wall facing the diaphragm and a second surrounding wall on an end of the second top wall, the step extends from one of the first surrounding wall and the second surrounding wall, and the clearance includes a first clearance that is provided between a surface of the peripheral portion and a surface of the step, with the respective surfaces being oriented toward each other in the thickness direction.

20. The piezoelectric sound component according to claim 19, wherein:

the surface of the peripheral portion is the main surface of the diaphragm, and the surface that is oriented toward the surface of the peripheral portion is a facing surface of the step that is oriented toward the main surface of the diaphragm.

* * * * *